INVENTOR.
CARL INGVAR BOKSJÖ
BY Bailey, Stephens &
Huettig 3,344,309
VAPOR RECTIFIER WITH DEIONIZATION CONTROL BY AN AUXILIARY VAPOR RECTIFIER
Carl Ingvar Boksjö, Ludvika, Sweden, assignor to Allmanna Svenska Elektriska Aktiebolaget, Vasteras, Sweden, a Swedish corporation
Filed Apr. 12, 1965, Ser. No. 447,314
Claims priority, application Sweden, Apr. 30, 1964, 5,396/64
7 Claims. (Cl. 315—163)

The present invention refers to a static converter comprising a rectifier bridge each branch of which comprises a main rectifier connected in parallel with an auxiliary rectifier.

Recently the demands for the rectifiers in converters for high voltage have increased through the need for increased voltages in D.C. transmissions. The increased voltages entail greater rectifier stresses during ignition and extinguishing of the rectifiers. In order to reduce these stresses it has been proposed to arrange an auxiliary rectifier which is connected in parallel with a main rectifier and which is ignited before and/or is extinguished later than the main rectifier in question. Among other things, this has the result that the time available for the deionization of the main rectifiers after their extinguishing is lengthened. In the previously proposed connections this lengthening of the available deionization period is however relatively short, since the lengthening is almost proportional to the current in the auxiliary rectifier and, since it is desired to form the auxiliary rectifier with relatively small dimensions, the maximum current in the auxiliary rectifier also becomes relatively small.

According to the present invention it is proposed to insert in the auxiliary rectifier circuit a transformer connection so arranged that an increasing current in the rectifier connection in said transformer connection induces a voltage directed against the anode voltage of the auxiliary rectifier. By suitable dimensioning of this transformer connection, the effect is obtained that when the main rectifier has ignited said induced voltage completely nullifies thet anode voltage of the auxiliary rectifier, so that the auxiliary rectifier is extinguished. When the current in the main rectifier at the next commutation begins to decrease, a voltage is again induced in the transformer connection in the auxiliary rectifier circuit, which voltage is directed so that the auxiliary rectifier will re-ignite and a commutation of current from the main rectifier to the auxiliary rectifier is obtained. Due to the fact that the auxiliary rectifier is only conducting for a short period at the beginning and end of the conducting interval of the main rectifier, the auxiliary rectifier can have a relatively heavy loading during these short conducting intervals. The main valve can therefore be made currentless at a very early moment of the commutation, so that a relatively long time at low voltage is available for its deionization.

Figure 1:
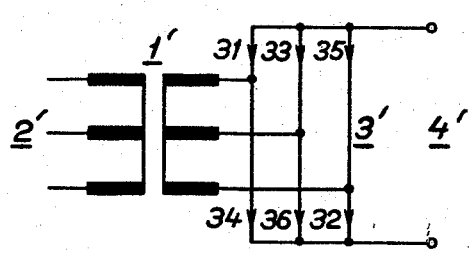
Figure 2:
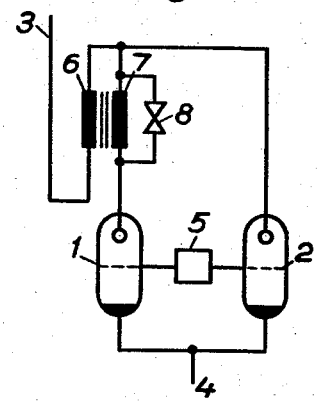
Figure 3:
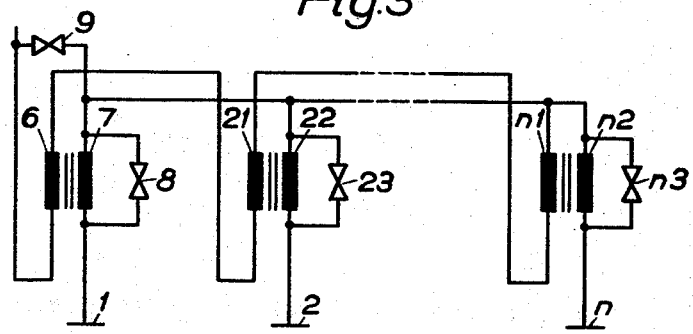
Figure 4:
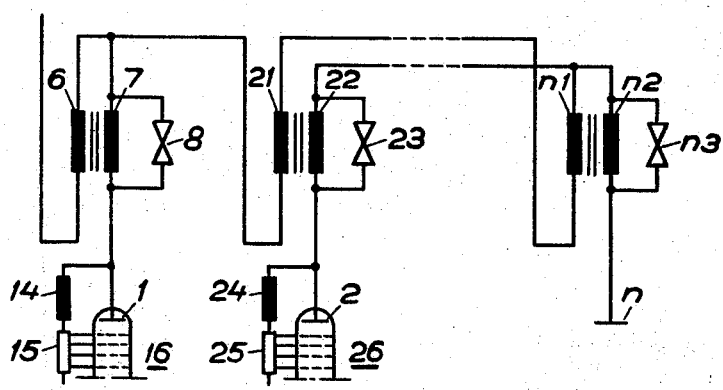

The invention will be more closely described with reference to the accompanying drawing, where FIG. 1 shows a conventional converter comprising a converter transformer and a rectifier bridge, while FIG. 2 shows a branch of said rectifier bridge corresponding to one of the rectifiers in FIG. 1 and comprising a main rectifier and an auxiliary rectifier according to the invention. FIGURES 3 and 4 show rectifier connections similar to that in FIG. 2, comprising an auxiliary rectifier and a number of parallel connected main valves.

FIG. 1 shows a converter comprising a converter transformer 1' connected on the one side to an A.C. network 2' and on the other side to a rectifier bridge 3' comprising six rectifiers 31–36, which rectifier bridge is provided with D.C. outputs 4'. It is possible to construct each of the rectifiers 31–36 as shown in FIG. 2, consisting of a main rectifier 2 and an auxiliary rectifier 1 connected in parallel, the rectifiers having common conductors 3 and 4. The control grids of the rectifiers are connected to a control apparatus 5 which is arranged so that the auxiliary rectifier 1 receives an ignition pulse a little earlier, for example 30 μsec. than the main rectifier 2. By this arrangement only the auxiliary rectifier 1 will ignite at full rectifier voltage, while the main rectifier 2 will ignite at a reduced voltage, so that the stresses on this rectifier during ignition are considerably reduced. In order to secure sufficient ignition voltage for the rectifier 2 it has been proposed to insert an impedance element 7 in series with the auxiliary rectifier 1 so that the main rectifier receives an ignition voltage corresponding to the voltage drop across this impedance element in series with the voltage drop across the auxiliary rectifier 1. According to the invention the element 7 constitutes a secondary winding of a transformer, whose primary winding 6 is inserted in the conductor 3 for the rectifier connection. The secondary winding 7 is connected so that increasing current in the conductor 3 and the primary winding 6 in the winding 7 will induce a voltage which is directed against the anode voltage of the auxiliary rectifier 1. This means that when the control grid of the main rectifier 2 has received an ignition pulse, the current in the auxiliary rectifier 1 will commutate to the rectifier 2 and by means of suitable dimensioning of the transformer 6, 7, the voltage induced in the winding 7 can bceome greater than the voltage drop in the auxiliary rectifier 1, so that this rectifier will become currentless when the main rectifier 2 has been ignited. In order to delay the saturation of the transformer core and thereby lengthen the time during which the voltage will be available for ignition of the rectifier 2, the winding 7 has been parallel connected with a voltage dependent resistor, a so-called varistor 8.

When the current in the main rectifier at the next commutation begins to decrease, a voltage will again be induced in the winding 7, but this time directed in the conducting direction of the rectifier 1. The rectifier 1 which during the conducting interval of the main rectifier was short circuited and therefore currentless will now be ignited by the voltage induced in the winding 7, which voltage will operate as a commutating voltage for the rectifiers 1 and 2, so that the current from the main rectifier 2 commutates to the auxiliary rectifier 1 at the same time as the total current of the complete rectifier connection decreases. The main rectifier 2 will therefore very quickly become currentless and will thus have time to become completely de-ionized before it is again exposed to high voltage. Because of the short conducting intervals of the auxiliary rectifier, a relatively high current in the auxiliary valve is permissible with an arrangement according to the invention, so that the invention gives a very effective utilization of the auxiliary rectifier. Further, it can be seen that the control grid of the auxiliary rectifier may retain its control voltage during the complete conducting interval of the main rectifier, since during this time the voltage over the auxiliary rectifier is not sufficient to ignite this rectifier.

In case of heavy loads on a converter it may be desirable to arrange several parallel connected main rectifiers as shown in FIGURES 3 and 4 which show connections of an auxiliary rectifier 1 and a number of main rectifiers 2–n. In these figures only the anodes of the different rectifiers have been shown and indicated with said numbers. In order to secure a suitable current distribution between the main rectifiers, a current divider is provided comprising a number of transformers inserted in the conductors to the different anodes of the main rectifiers. This current divider of a type which is already previously known, consists of a number of primary windings 21–n1, which are connected in series in the main conductor of the rectifiers and a number of secondary windings 22–n2 which are inserted in the parallel conductors to the different rectifiers 2–n respectively. These transformers are thus formed like the transformer 6, 7 corresponding to the auxiliary rectifier 1, but the secondary windings are connected in the opposite direction so that a current increasing for example in the main rectifier 2 passes through the primary winding n1 and induces a voltage in the secondary winding n2 which voltage is added to the anode voltage of the rectifier n and thereby facilitates the ignition of this rectifier. The ratio of turns of the transformers of the different main rectifiers is suitably 1/n, so that an equal current distribution between the main rectifiers involves a balance in the number of ampere turns in the current divider transformers of the main rectifiers. Like to the transformer of the auxiliary rectifier, the secondary windings on the transformers of the main rectifiers are parallel connected with voltage dependent resistors 23–n3 respectively.

In FIG. 3 the transformer 6, 7 of the auxiliary rectifier has been connected in a similar way to the transformers of the main rectifiers, so that the current occurring in the auxiliary rectifier will induce voltages both in the winding 7 and in the secondary windings 22–n2 of the different main rectifiers. These latter voltages for the different rectifiers will be added to the common voltage coming from the winding 7, so that the ignition voltage for all the main rectifiers is increased. In the connection shown in FIG. 4 no voltages will be induced in the transformers of the main rectifiers before the first main rectifier has been ignited. However, if there is a relatively long delay of ignition pulses for the main rectifiers according to FIG. 3, it will be seen that the voltage in the transformers of the main rectifiers induced by the auxiliary rectifier current during the delay period cannot be utilized, which means a reduction of the voltage time integral which is available for ignition of the main rectifiers. In the connection according to FIG. 4 this is not the case so that the transformers of the main rectifiers here are unmagnetized when the main rectifiers receive their ignition pulse and the later igniting rectifiers can completely and fully utilize the auxiliary voltage induced in their transformers by the current of the first igniting main rectifier. In FIG. 3 an over voltage protection for the series connected transformer windings 6 and 21–n1 in the form of a voltage dependent resistor 9 has also been shown.

In order to improve the ignition conditions for the main rectifier which is ignited first, for example 2 in FIG. 4, a winding 24 arranged as a secondary winding on the transformer 6, 7 for the auxiliary rectifier can be connected in series with a voltage divider 25 for the intermediate electrodes 26 in this rectifier. The current flowing in the primary winding 6 will induce a voltage in the winding 24 which is added to the voltage across the voltage divider 25, which improves the ignition conditions for the main rectifier 2. In a similar way a winding 14 on the transformer 6, 7 connected in series with a voltage divider 15 for the intermediate electrodes 16 in the auxiliary rectifier 1 can facilitate the re-ignition of the auxiliary rectifier at that moment when the current is to commutate from the rectifier connection described here to the next rectifier connection in the proper commutation group.

I claim:
1. A static converter comprising a rectifier bridge, each branch of which comprises a main rectifier and an auxiliary rectifier connected in parallel, transformer means for each branch, means connecting one side of said transformer means in series with said main rectifier, means connecting the other side in series with said auxiliary rectifier, said transformer means being arranged to induce, in response to an increase of current in the first mentioned side of the transformer means, a voltage in said other side of the transformer means directed against the voltage across said auxiliary rectifier.

2. In a static converter as claimed in claim 1, ignition circuits for the main and the auxiliary rectifier of each branch; the ignition circuit for the main rectifier being delayed in time in relation to that for the corresponding auxiliary rectifier.

3. In a static converter as claimed in claim 1, said transformer means comprising a primary winding connected in series with said rectifying branch; and a secondary winding connected in series with said auxiliary rectifier.

4. In a static converter as claimed in claim 3; a voltage depending resistor connected in parallel with said secondary winding of said transformer means.

5. In a static converter as claimed in claim 1; the ratio of turns in said transformer means being such that the voltage induced in said other side of the transformer means is at least equal to the forward voltage drop of said auxiliary rectifier.

6. In a static converter as claimed in claim 1; each rectifying branch comprising an auxiliary rectifier parallel connected to a plurality of main rectifiers; an inductive current divider connecting said main rectifiers in parallel; the primary side of said transformer means being connected in series with said current divider, the secondary side being connected in parallel to said current divider.

7. In a static converter as claimed in claim 1; each rectifying branch comprising an auxiliary rectifier parallel connected to a plurality of main rectifiers; an inductive current divider connecting said main rectifiers in parallel; said current divider comprising a primary and a secondary winding for each main rectifier; said first side of said transformer means being connected in series with all said primary windings; said other side of said transformer means being connected in parallel with all said secondary windings.

References Cited
UNITED STATES PATENTS 2,140,736  12/1938  Demontvignier _____ 315—258
2,721,960  10/1955  Smart _____ 315—258

JAMES W. LAWRENCE, *Primary Examiner.*

C. R. CAMPBELL, *Assistant Examiner.*